United States Patent [19]
Voelker et al.

[11] 3,765,629
[45] Oct. 16, 1973

[54] CONDUIT SUPPORT AND SPACER MEANS

[75] Inventors: James E. Voelker, Bay Village;
James R. Cisar, Guyahoga Falls,
both of Ohio

[73] Assignee: Standard Oil Company,
Chicago, Ill.

[22] Filed: Apr. 16, 1971

[21] Appl. No.: 134,724

[52] U.S. Cl. ............ 248/68 CB, 138/106, 138/112,
248/74 R
[51] Int. Cl. ............................................... F16l 3/22
[58] Field of Search ...................... 248/68 CB, 68 R;
138/112, 113, 111; 285/137 R

[56] References Cited
UNITED STATES PATENTS
3,523,667   8/1970   Guerrero .................... 248/68 CB
1,798,167   3/1931   Parker ............................. 138/112
3,188,030   6/1965   Fischer ........................ 248/68 CB FOREIGN PATENTS OR APPLICATIONS
540,129   4/1957   Canada .............................. 138/112

*Primary Examiner*—Roy D. Frazier
*Assistant Examiner*—Rodney H. Bonck
*Attorney*—Arthur G. Gilkes and William T. McClain

[57] ABSTRACT

A conduit support and spacer means comprised in combination of: at least two separators; at least two connection members operably attached and spaced on each separator; and at least one bridge comprising: conduit conforming support means; and at least two connection members attached to said conduit conforming support means each capable of mating with an aforesaid connection member of said separator to form a connection.

4 Claims, 12 Drawing Figures

INVENTORS
JAMES R. CISAR
JAMES E. VOELKER 3,765,629

CONDUIT SUPPORT AND SPACER MEANS

BACKGROUND OF THE INVENTION

Frequently it is desired to place conduits containing electric wires and telephone lines below ground. In the placing of these conduits below ground a trench is dug and several conduits are placed therein. The trench is then filled with a filler material surrounding the conduits. The filler material may be sand, gravel, sawdust or even concrete. It is frequently advantageous to put many different sized conduits in the same trench. Preferably the conduits are uniformly spaced to facilitate filling the space therebetween and to prevent one conduit from interfering or touching another. Frequently it is imperative that these conduits have a minimum spacing between each other, for example, a minimum spacing is necessary when there is an electromagnetic field emanating from one conduit which could interfer with signals carried by wires in an adjacent conduit. Most commonly, bricks or other convenient materials are used to accomplish this spacing. This disadvantage of such materials are many. For example, when several tiers of conduits are placed in the same trench the bricks used to space the various upper tiers may fall out of position. The conduits then may fall or become unsupported to the extent that they collapse or crack. Any of these events will ultimately interfere with the conduit encasing and shielding the wires contained therein. Of course, if the conduit is carrying a liquid or other fluid, leakage will occur and the problems will be compounded.

To aptly effectively space conduits those skilled in the art have developed various support and spacer means. The invention disclosed and claimed herein is one such support and spacer means. However, unlike the support and spacer means of the prior art this invention comprises a support and spacer means which is easily adaptable to accommodate any number of different sized conduits and any number of different sized conduits and any number of tiers of conduits. An outstanding feature of the present invention is that the various parts of the conduit support and spacer are easily interchanged so that only a relatively small inventory of parts is needed in order to accommodate conduits of many different sizes.

SUMMARY OF THE INVENTION

The invention is a conduit support and spacer means comprised in combination of at least two separators; at least two connection members operably attached and spaced on each separator; and at least one bridge comprising conduit conforming support means; and at least two connection members attached to said conduit conforming support means each capable of mating with an aforesaid connection member of said separator to form a connection.

Conduit support and spacers of this invention have been found to be useful for supporting conduits of all sizes. Of course, it is understood to those skilled in the art that pipes may be similarly supported and spaced as are conduits. Therefore, the term conduit as used herein and in the claims is understood to include pipes and other tubular constructions as well as conduits. The conduit support and spacer of this invention has the additional advantage of being constructed of plastic, thus, it is easy to use, inexpensive and resistant to rotting, rusting and corrosion. Another interesting feature of the conduit spacer and support means of this invention is that it is comprised of interlocking parts which, when positioned, are secured to one another to form an aggregate network of support and spacer members. This interlocking network is especially useful when the filler between the conduits is concrete, since it does not allow any motion of any of the conduits with respect to each other, and it is especially effective in preventing the upper tier of conduits from being bouyed up and away from the others as the concrete is poured.

DESCRIPTION OF THE DRAWINGS

FIG. 5b is an elevational view of the separator of FIG. 5a.

PREFERRED EMBODIMENTS

Figure 1:
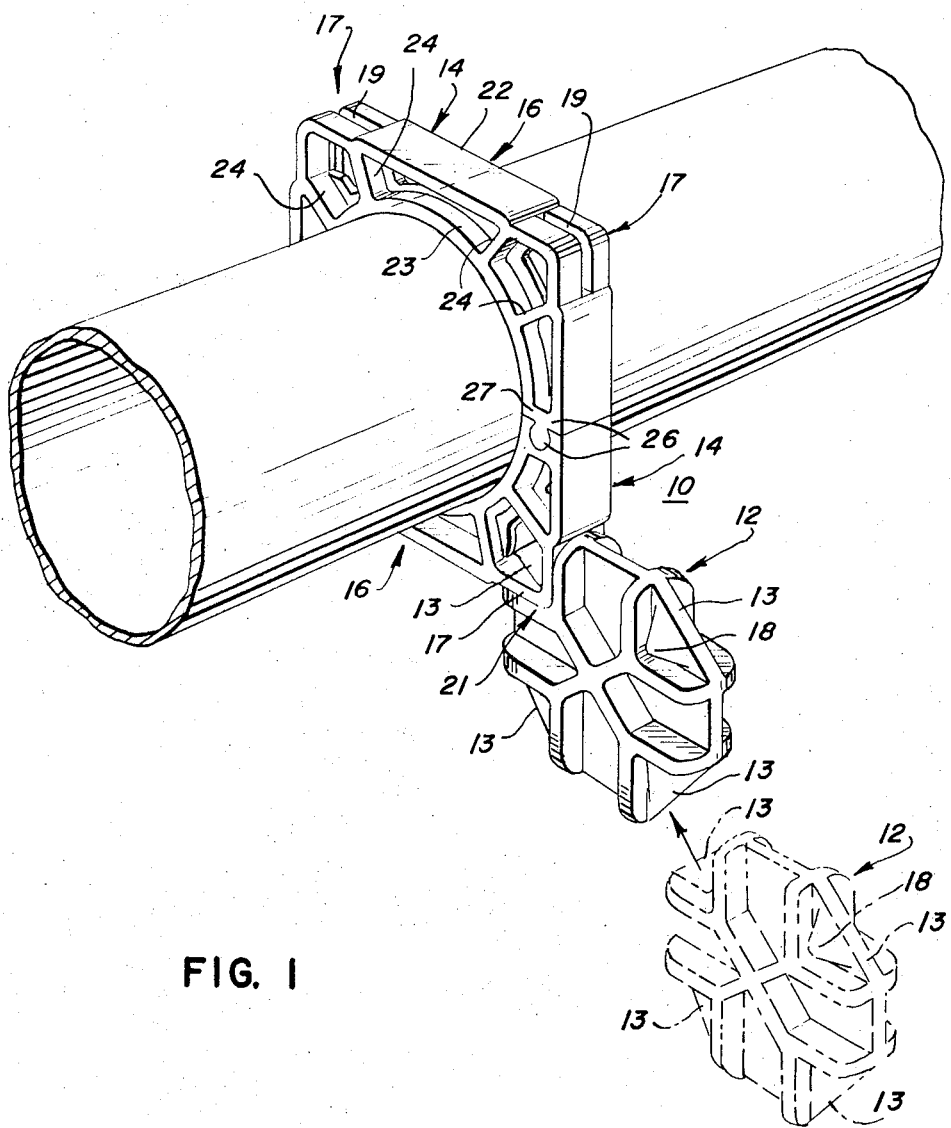
FIG. 1 is a perspective view of a conduit showing the relative position of the various cooperating parts of the support and spacer means of this invention when operably positioned thereon.

In FIG. 1 conduit support and spacer 10 is comprised of: at least two separators (one not shown) 12 having at least two connection members 13, and bridge 14 having at least two connection members 17. Bridge 14 is comprised of conduit conforming support means 16 having complementary coupling portions 26. Conduit conforming support means 16 is comprised of frame 22 and arcuated collar 23 connected thereto. Arcuated collar 23 depends from frame 22 inwardly in a concave manner. Struts 24 connect arcuated collar 23 to frame 22. As shown in FIG. 1, separator 12 can be connected and locked to bridge 14. The locking means 18 on separator 12 engages the locking means 19 of the connection member of bridge 14. When both locking means are engaged, the separator and bridge are locked into position and do not easily separate. The locked connection 21 is shown in FIG. 1. Also shown in dashed lines in FIG. 1 is separator 12 before being connected and locked to bridge 14.

Figure 2:
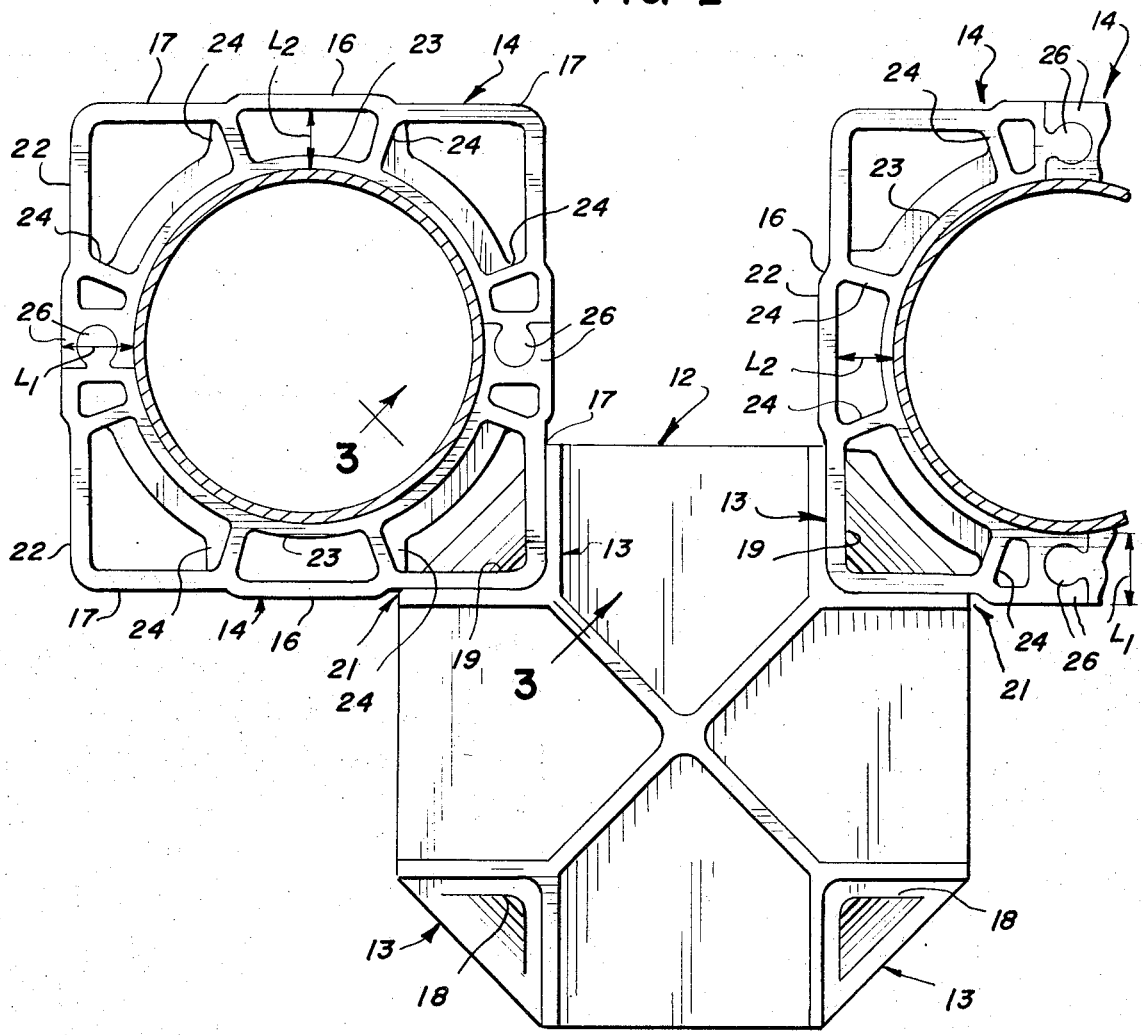
FIG. 2 is an elevational view of the conduit support and spacer means of this invention.

FIG. 2 shows a partial elevational view of a separator and four bridges. The bridges are rotably and invertedly mounted and attached to each other by virtue of complementary coupling portions 26. FIG. 2 shows that the position of coupled bridges is not important and that when two bridges are coupled together, any of the four corners may be accommodated by a separator means. FIG. 2 shows the nonadjacent sides of an octagon shaped flat plate separator to be the connection members 13.

It is clear from FIGS. 1 and 2 that any number of separators and bridges may be used in combination to support any number of conduits in tiers. It is also apparent from FIGS. 1 and 2 that various sized conduits may be accompanied in any order, that is, randomly, side-by-side, or in tiers one larger layer above one smaller layer etc.

Figure 3:
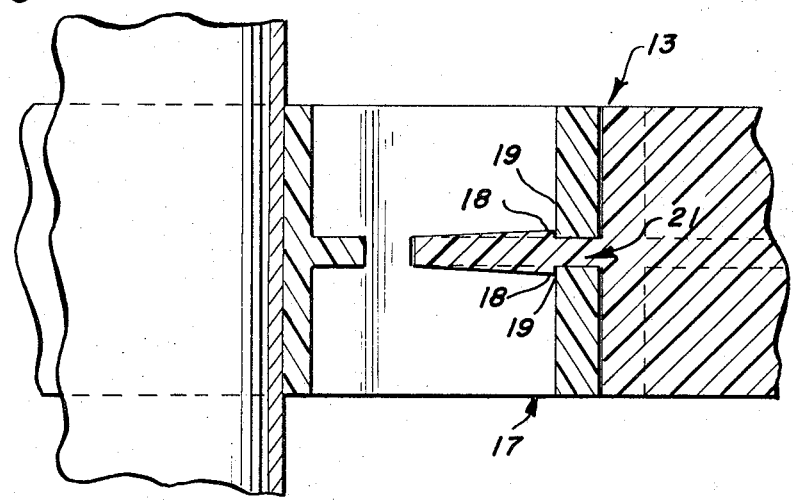
FIG. 3 is a partial sectional view taken along lines 3—3 of FIG. 2.
Figure 4A:
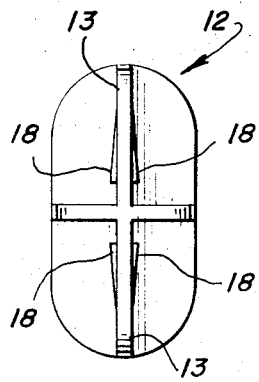
FIG. 4a is a cross-sectional elevational view of a separator of this invention.
Figure 4B:
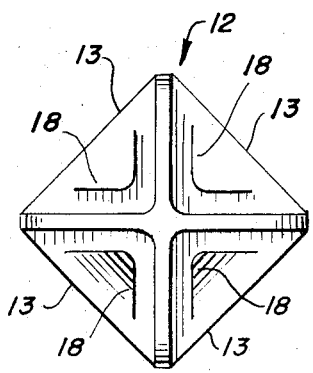
FIG. 4b is an elevational view of a separator of this invention.
Figure 4C:
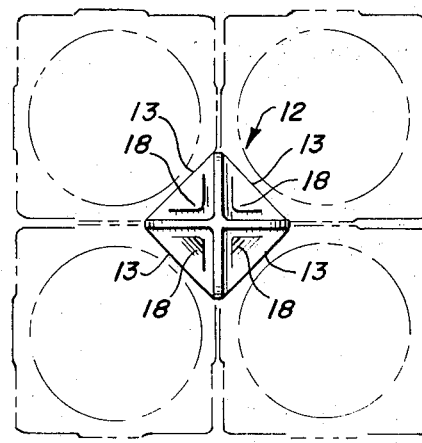
FIG. 4c is an elevational view of a separator of this invention positioned between eight bridges which engage four separate conduits.

FIG. 3 shows a partial elevational sectional view along lines 3—3 of FIG. 2. FIG. 3 shows connection 21 itself with the locking features of this invention. Locking means 19 on the connection member 17 of bridge 14 is merely the edge of a narrow slit in the corner of bridge 14. The complementary locking means 18 on separator 12 is merely the edges of two slightly inclined planes positioned on opposite sides of flat plate separator 12. One can see from FIG. 3 that these two locking means coact to give a positively locked connection 21, which is not easily separable. This feature of the invention allows rough treatment of the support and spacer without fear of the conduits becoming disturbed in their spaced relationship to each other. FIGS. 4a, 4b, 4c, 5a, 5b and 5c show the use of various sized separators to accomplish various spacing distances between conduits. In FIGS. 4a, 4b, and 4c, it is shown how a spacer may provide essentially no separation between the various bridges connected thereto. In such case the separator merely fastens the bridges one to another. The spacing is then accomplished by the thickness and length of the various bridge portions connected to said separator. Generally it is preferred that distances $L_1$ and $L_2$ on bridges 14 (FIG. 2) be equal, so that the spacing between conduits will be equal in both the horizontal and vertical directions. If, for example, the distances $L_1$ and $L_2$ of the bridge portion are one-half inch, then there will be a total of one inch spacing between two adjacent conduits.

Figure 5A:
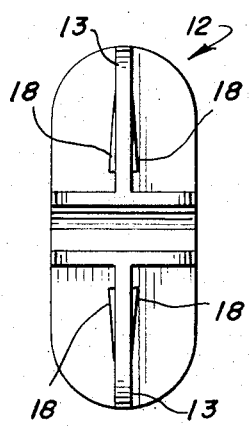
FIG. 5a is a cross-sectional view of a second separator of this invention.
Figure 5B:
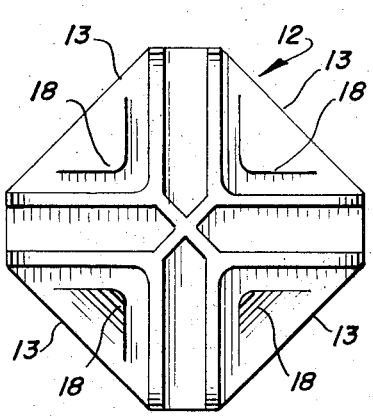
Figure 5C:
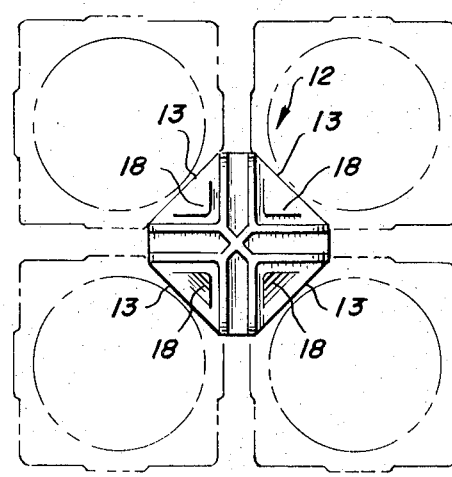
FIG. 5c is an elevational view of a separator of FIG. 5b separating four conduits.

FIGS. 5a, 5b, and 5c show a separator which has, between the various connection members, a distance of about one-half inch. Thus, if again the thickness of the bridge at its narrowest point is one-half inch the total spacing between adjacent conduits will be one and one-half inches. The one and one-half inches are comprised of one-half inch of a first bridge, one-half inch of spacer, and one-half inch of a second bridge. Distances between the various connection members on any separator may be arbitrarily chosen. Generally distances from zero, as shown in FIGS. 4a, 4b, and 4c, to about 6 inches are preferred.

It is easily seen from FIGS. 4a, 4b, 4c, 5a, 5b, and 5c that the minimum number of bridges and separators to accomplish support is as follows: one bridge and two separators will support a single conduit. Two bridges coupled together and two separators will support a single conduit and capture the conduit, thus preventing it from escaping the support.

One interesting feature of the bridges of this invention is that a bridge which accommodates a one-inch conduit may be attached to the same separator which is in turn attached to a bridge which accommodates a 6 inch conduit. Thus, it is possible to have two tiers comprised of a one-inch and a 6 inch conduit diagonally opposite and in spaced fixed relationship to each other.

Figure 6:
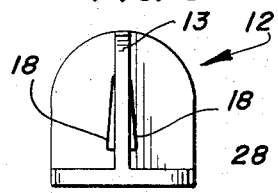
FIG. 6 is a cross-sectional view of a base separator of this invention.

FIG. 6 shows a cross-sectional elevational view of a separator which is preferred for the bottom tier of conduits. This separator is essentially one-half of the previously shown separator. The advantage of such a separator is that it may be molded with a flat base 28 to lend some support to the various tiers of conduits placed thereon. For example, it may be desirable to have a base to prevent the lowermost tier of conduits from sinking into sand or light soil. Also there is some cost savings, since the total amount of material is less in such a separator.

Figure 7:
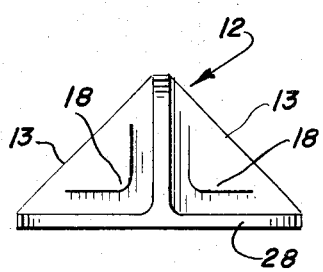
FIG. 7 is an elevational view of a base separator of this invention.

FIG. 7 shows an elevational view of a separator of FIG. 6.

Figure 8:
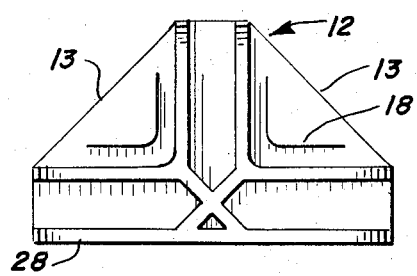
FIG. 8 is an elevational view of a second base separator of this invention.

FIG. 8 shows a separator similar to the separator of FIG. 7. In FIG. 8 it is clear that there is about one-half inch separating the two connection members positioned on the separator. It is clear from FIG. 8 that other separators can be fabricated having more than one-half inch distance between connection members. Each of these separators can be used in conjunction with like separators to support conduits.

To assemble the invention of this disclosure, one merely selects separators which will support his conduit the desired distance above the surface and/or away from other separators. Then he positions the separators on bridges which are of suitable size to accommodate his conduit, building a connected structure as he proceeds. The separators support each end of a bridge and are disposed in the area in which the conduits are to be positioned. The first tier of conduits is then placed in position on the bridges and second bridges are placed thereover. The second bridges are locked into position and a secondary row of separators is positioned thereon. Another tier of bridges may be positioned on top of the first if desired. Consequently, it is possible to position a second tier of conduits above the first. This process may continue until all of the conduits have been positioned and spaced as desired. The conduits are now ready to have the filler placed therearound.

Although the invention of this disclosure has been described in terms of spacing and supporting conduits with a view toward placing a filler material therearound, such is not necessary. For example, it may be desirable to space and support conduits above ground, or in a trench without using any filler material. Such support and spacing is possible and can be achieved very easily by utilizing the invention of this disclosure.

Having thus described the invention what is claimed is:

1. A conduit support and spacer comprised, in combination, of:
   at least two generally octagon-shaped separator plates;
   at least two male connection members on nonadjacent sides of said separator plates; and
   at least one bridge comprising:
      a frame;
      an arcuated collar attached concave inwardly to said frame;
      a multiplicity of struts connecting said frame and said arcuated collar; and
   at least two slotted connection members attached to said frame, each capable of mating with an aforesaid connection member of said separator plates to form a connection.

2. The conduit support and spacer of claim 1 wherein each of said nonadjacent sides of said generally octagon shaped plates, and each of said connection members of said bridge comprise:

at least one locking means integral therewith, each of said locking means of said nonadjacent sides of said generally octagon shaped plates being complementary to each of said locking means of said connection members of said bridge, said complementary locking means being capable of mating to form a locked connection.

3. The conduit support and spacer of claim 2 wherein said bridge additionally comprises two complementary coupling portions positioned thereon in such a manner that a like bridge may be invertedly and rotatably coupled to the first bridge with the result that the arcuated collars of each align to describe a generally circular collar.

4. A conduit support and spacer comprised, in combination, of:

at least two separators comprising:
a generally octagon shaped plate, at least two of the nonadjacent sides of said plate forming connection members;
two parallel protruding integral ridges on opposite surfaces of the nonadjacent sides of said plate forming connection member locking means; and at least one bridge comprising:
a frame;
a generally semicircular collar;
two chord-like projections protruding outwardly from the respective ends of said semicircular collar connecting said frame and semicircular collar, with the semicircular collar being concave inwardly to said frame;
a multiplicity of struts connecting said frame and said semicircular collar;

at least two complementary coupling portions attached in equal number to each of said chord-like projections in such a manner that a like bridge may be invertedly and rotatably coupled to the first bridge with the result that the semicircular collars of each align to describe a generally circular collar.

* * * * *

UNITED STATES PATENT OFFICE
CERTIFICATE OF CORRECTION

Patent No. 3,765,629     Dated  October 16, 1973

Inventor(s)  Voelker, James E. and Cisar, James R.

It is certified that error appears in the above-identified patent and that said Letters Patent are hereby corrected as shown below:

TITLE PAGE:

Guyahoga Falls   should be   -- Cuyahoga Falls --.

Signed and sealed this 21st day of May 1974.

(SEAL)
Attest:

EDWARD M. FLETCHER, JR.
Attesting Officer

C. MARSHALL DANN
Commissioner of Patents